US008164853B2

(12) United States Patent
Hirata et al.

(10) Patent No.: US 8,164,853 B2
(45) Date of Patent: Apr. 24, 2012

(54) PERPENDICULAR MAGNETIC WRITE HEAD WITH SIDE SHIELD SATURATION MAGNETIC FLUX DENSITY INCREASING AWAY FROM MAGNETIC POLE

(75) Inventors: Kei Hirata, Tokyo (JP); Atsushi Yamaguchi, Tokyo (JP); Masaya Kato, Tokyo (JP); Hideyuki Ukita, Tokyo (JP); Kenkichi Anagawa, Tokyo (JP); Minoru Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 221 days.

(21) Appl. No.: 12/719,451

(22) Filed: Mar. 8, 2010

(65) Prior Publication Data

US 2011/0216443 A1 Sep. 8, 2011

(51) Int. Cl.
*G11B 5/10* (2006.01)
*G11B 5/31* (2006.01)

(52) U.S. Cl. .................................... 360/125.3; 360/128

(58) Field of Classification Search ............... 360/125.3, 360/128

See application file for complete search history.

(56) References Cited

U.S. PATENT DOCUMENTS

| | | | | |
|---|---|---|---|---|
| 6,025,978 | A * | 2/2000 | Hoshi et al. | 360/319 |
| 7,573,683 | B1 * | 8/2009 | Benakli et al. | 360/319 |
| 2004/0212923 | A1 * | 10/2004 | Taguchi | 360/125 |
| 2005/0068670 | A1 * | 3/2005 | Amin et al. | 360/125 |
| 2005/0141137 | A1 * | 6/2005 | Okada et al. | 360/122 |
| 2007/0146929 | A1 | 6/2007 | Maruyama et al. | |
| 2008/0259498 | A1 * | 10/2008 | Lengsfield et al. | 360/235.4 |
| 2008/0278853 | A1 * | 11/2008 | Kameda et al. | 360/119.02 |
| 2008/0278862 | A1 * | 11/2008 | Kameda et al. | 360/319 |
| 2009/0154012 | A1 | 6/2009 | Mochizuki et al. | |
| 2009/0154026 | A1 * | 6/2009 | Jiang et al. | 360/319 |
| 2009/0273863 | A1 * | 11/2009 | Kawano et al. | 360/319 |

FOREIGN PATENT DOCUMENTS

| | | |
|---|---|---|
| JP | A-2006-277905 | 10/2006 |
| JP | A-2007-128581 | 5/2007 |
| JP | A-2008-123600 | 5/2008 |
| JP | A-2009-146508 | 7/2009 |
| JP | A-2009-176399 | 8/2009 |

* cited by examiner

*Primary Examiner* — Craig A. Renner
(74) *Attorney, Agent, or Firm* — Oliff & Berridge, PLC

(57) ABSTRACT

A perpendicular magnetic write head is provided with a magnetic pole and a pair of side shields disposed on both sides of the magnetic pole in a cross track direction with side gaps in between. Each of the pair of side shields is configured in such a manner that a saturation magnetic flux density thereof increases as a distance from the magnetic pole in the cross track direction increases. Such a configuration allows unwanted divergence component of magnetic flux in a recording magnetic field to be captured while avoiding any excessive capturing of the recording magnetic field, and while preventing any intensity reduction of the recording magnetic field in its entirety. As a result, the recording magnetic field is maintained to have an adequate intensity and spreading of the recording magnetic field is suppressed, so that the recording capabilities are improved.

8 Claims, 10 Drawing Sheets

PERPENDICULAR MAGNETIC WRITE HEAD WITH SIDE SHIELD SATURATION MAGNETIC FLUX DENSITY INCREASING AWAY FROM MAGNETIC POLE

BACKGROUND OF THE INVENTION

1. Field of the Invention

The present invention relates to a perpendicular magnetic write head provided with a magnetic pole and a side shield layer, and a magnetic recording device incorporating the head.

2. Description of the Related Art

Due to the recent increase of the areal recording density of a magnetic recording medium (hereinafter, referred to as "recording medium") typified by a hard disk, there is a demand for the better performance capabilities of a magnetic write head. In order to meet such a demand, as an alternative to the longitudinal magnetic recording mode that has been the recording mode for the magnetic write head, the perpendicular magnetic recording mode is now receiving attention. With the longitudinal magnetic recording mode, the direction of a signal magnetic field is set to be in the in-plane direction of a recording medium, and with the perpendicular magnetic recording mode, the direction thereof is set to intersect with the plane thereof. This is due to advantages of a higher linear recording density, and less susceptibility of any recording medium completed with recording to thermal fluctuations.

A magnetic write head of such a perpendicular magnetic recording mode (hereinafter, referred to as "perpendicular magnetic write head") is provided not only with a thin-film coil for use to generate magnetic fluxes but also with a main magnetic-pole layer for use to direct, to a recording medium, the magnetic fluxes generated by the thin-film coil, for example. This main magnetic-pole layer includes a tip end portion (magnetic pole) of a very narrow width for generation of a magnetic field for recording use (recording magnetic field).

As to the configuration of such a perpendicular magnetic write head, providing a side shield layer thereto has been under study to respond to the increasing recording density without increasing the size of the recording magnetic field. The side shield layer is to be provided via a gap on both sides of the magnetic pole in the width direction of a recording track (examples for reference include Japanese Unexamined Patent Publication Nos. 2004-326990, 2004-022004, and 2005-310363).

In such circumstances, the areal recording density of the recording medium is increasing all the more, and thus recently, the demand is increasing for the more appropriate configuration of the perpendicular magnetic write head. With the previous perpendicular magnetic write head provided with the side shield layers, however, ensuring the recording magnetic field to be adequate in intensity is in a relationship of "trade-off" with not increasing the size thereof, and such attempts are difficult to be achieved at the same time. There is thus still a room for improvement in terms of recording capabilities.

As such, improving the recording capabilities is very much expected through achievement of such attempts at the same time of ensuring the recording magnetic field to be adequate in intensity while not increasing the size thereof.

SUMMARY OF THE INVENTION

A perpendicular magnetic write head of an embodiment of the invention is provided with a magnetic pole, and a pair of side shields. The magnetic pole has an end surface exposing to an air bearing surface. The side shields are each provided with an end surface exposing to the air bearing surface, and are provided respectively on both sides of the magnetic pole in the cross track direction with side gaps in between. Herein, these side shields are each so configured that a saturation magnetic flux density thereof increases as a distance from the magnetic pole in the cross track direction increases, with a base point being a point closest to the magnetic pole.

A magnetic recording device of an embodiment of the invention is provided with a recording medium, and a perpendicular magnetic write head of the above embodiment.

In the perpendicular magnetic write head of the embodiment of the invention, and in the magnetic recording device incorporating the head, a pair of side shields are each so configured that a saturation magnetic flux density thereof increases in value with distance from a magnetic pole with a base point being a point closest to the magnetic pole in the cross track direction. Such a configuration allows capturing of any unwanted divergence component of magnetic flux in a recording magnetic field while preventing any excessive capturing of the recording magnetic field, and while preventing any intensity reduction of the recording magnetic field in its entirety. Accordingly, the recording magnetic field is ensured to be adequate in intensity at the same time as is prevented from increasing in size so that the recording capabilities may be improved.

DETAILED DESCRIPTION OF THE PREFERRED EMBODIMENT

Figure 1B:
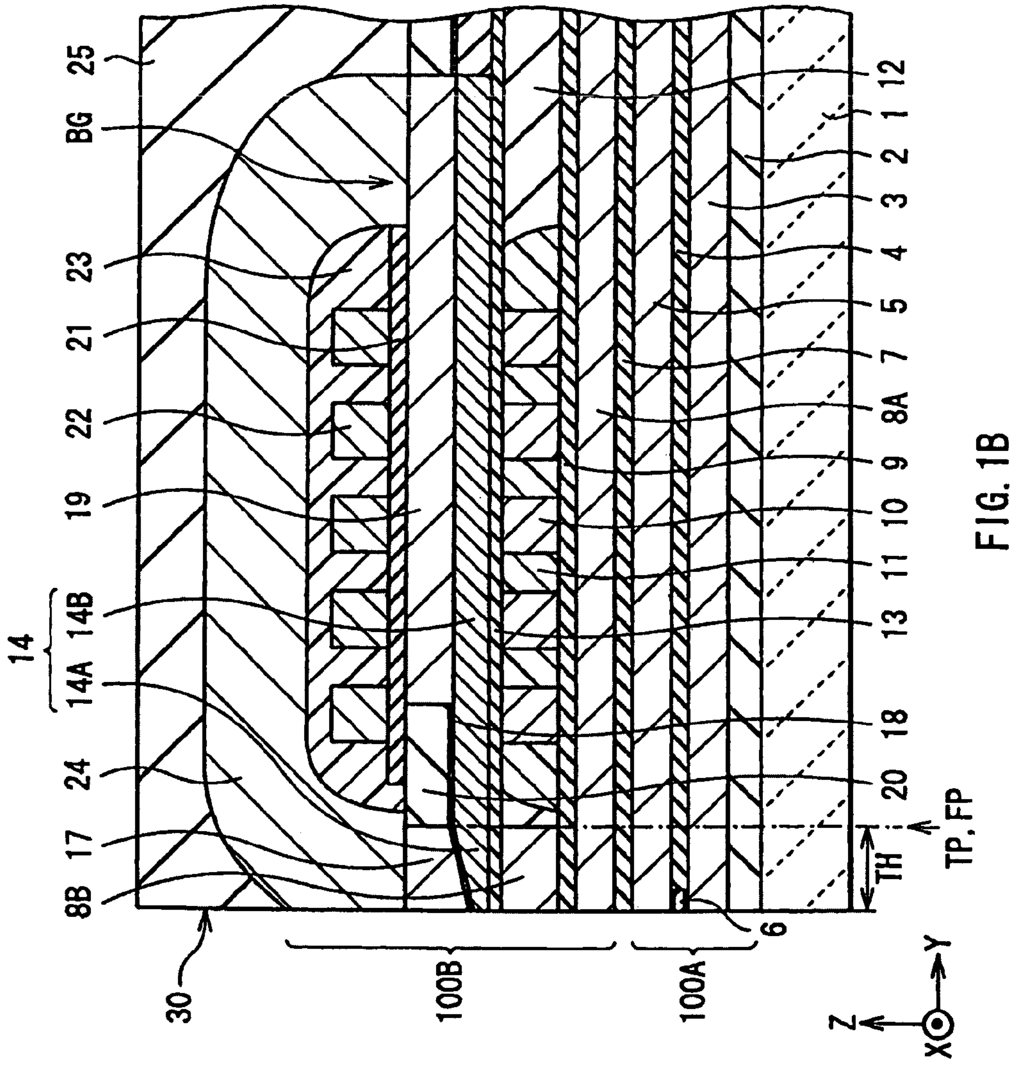
FIGS. 1A and 1B are cross-sectional views of the configuration of a thin-film magnetic head provided with a perpendicular magnetic write head of an embodiment of the invention.

In the below, an embodiment of the invention is described in detail by referring to the drawings.

[Configuration of Thin-Film Magnetic Head Including Perpendicular Magnetic Write Head]

Figure 1A:
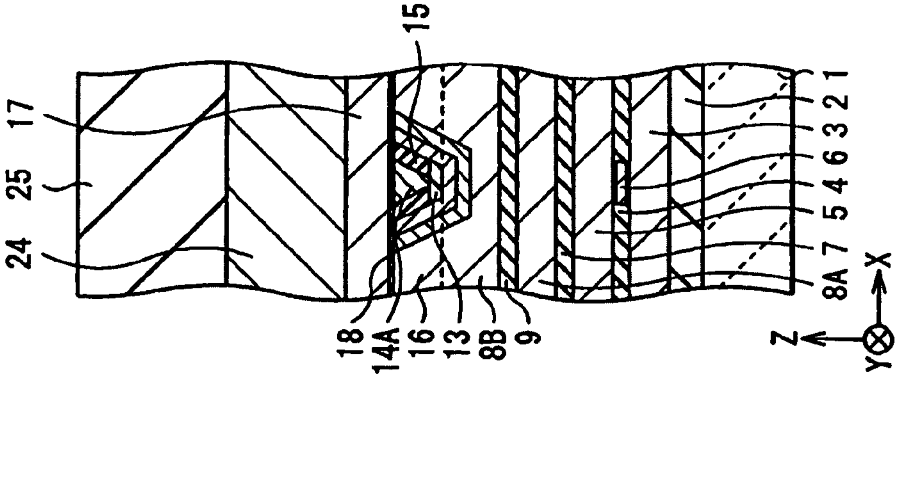
Figure 2:
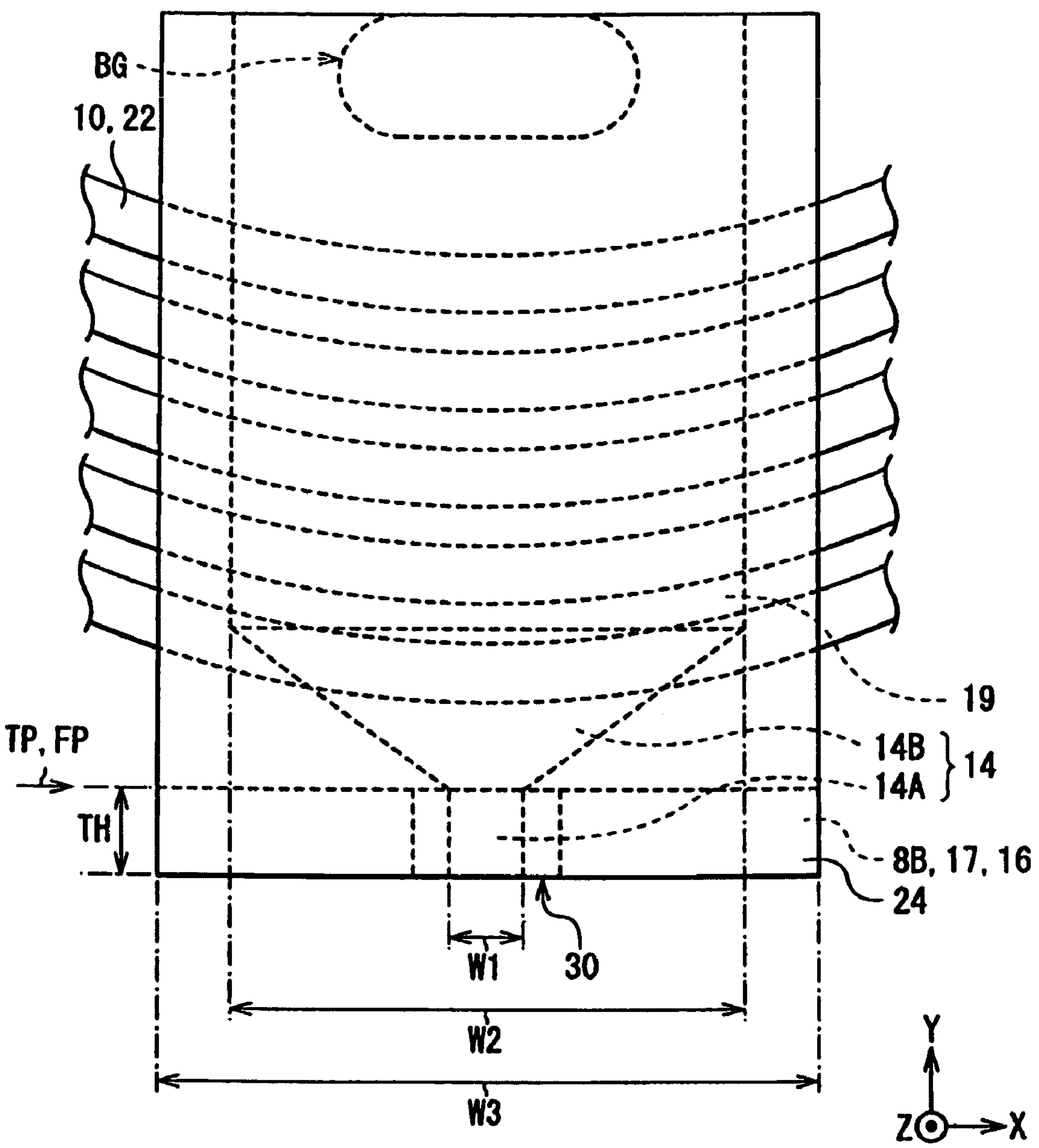
FIG. 2 is a plan view of the configuration of a main part of the thin-film magnetic head of FIG. 1.
Figure 3:
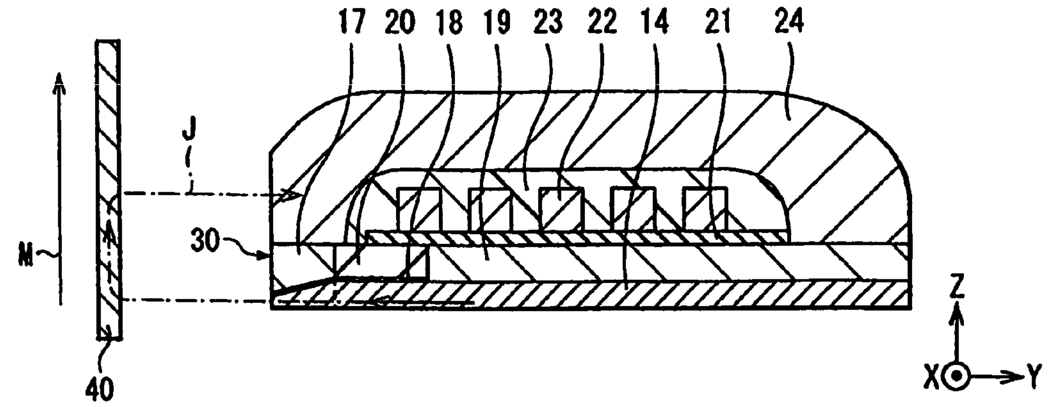
FIG. 3 is a cross-sectional view for illustrating the relationship between the thin-film magnetic head of FIG. 1 and a recording medium.

FIGS. 1 to 3 each show the configuration of a thin-film magnetic head including a perpendicular magnetic write head. To be specific, FIG. 1 shows the entire cross-sectional configuration, FIG. 2 shows the configuration of the main part in a planar view, and FIG. 3 illustrates the relationship between the thin-film magnetic head and a recording medium 40. FIG. 1A is showing the cross section parallel to an air bearing surface 30, and FIG. 1B is showing the cross section perpendicular to the air bearing surface 30. Herein, an upward arrow M in FIG. 3 indicates the moving direction of the recording medium 40 relative to the thin-film magnetic head.

In the description below, the dimensions in the X-axis direction, the Y-axis direction, and the Z-axis direction in FIGS. 1 to 3 are respectively referred to as "width", "length", and "thickness". In the Y-axis direction, the side near the air bearing surface 30 is referred to as "front", and the side away therefrom as "rear". In the direction of the arrow M, the side toward the front is referred to as "trailing side", and the side toward the rear as "leading side". These are applicable also in a description to be given later by referring to FIG. 4 and others.

The thin-film magnetic head in this description is the one for executing a magnetic process to the recording medium 40 such as hard disk, and is a combined head capable of both a reproduction process and a recording process, for example.

Such a thin-film magnetic head is exemplarily in the configuration of FIG. 1 including an insulation layer 2, a reproduction head section 100A, a separation layer 7, a write head section 100B, and an overcoat layer 25, which are laminated together on a substrate 1 in this order. The configuration also includes the air bearing surface 30, which serves as one side surface for all of these components above.

The substrate 1 is made of a ceramic material including AlTiC ($Al_2O_3$.TiC), for example. The insulation layer 2, the separation layer 7, and the overcoat layer 25 are each made of a non-magnetic insulation material including aluminum oxide, for example. This aluminum oxide is exemplified by alumina ($Al_2O_3$).

The reproduction head section 100A is in charge of executing a reproduction process utilizing MR (the magneto-resistive effect). Such a reproduction head section 100A is laminated thereon with, in this order, a lower lead shield 3, a shield gap 4, and an upper lead shield 5, for example. In this shield gap 4, a reproduction element (MR element 6) is embedded in such a manner that an end surface thereof is exposed to the air bearing surface 30.

The lower lead shield 3 and the upper lead shield 5 are those provided for magnetically separating the MR element 6 from the area therearound, and are extending from the air bearing surface 30 toward the rear. The lower lead shield 3 is made of a magnetic material including alloy of nickel and iron (NiFe), for example. The alloy of nickel and iron is exemplified by permalloy (trade name) in which a nickel content is 80 wt % and an iron content is 20 wt %. The upper lead shield 5 is also made of a magnetic material such as permalloy. Herein, the lower lead shield 3 and the upper lead shield 5 may be each in a single- or multi-layer structure. When these shields are each in a multi-layer structure, the shield may be configured by a pair of magnetic layers (those made of a magnetic material such as permalloy) sandwiching therebetween a non-magnetic layer (the one made of a non-magnetic conductive material such as ruthenium (Ru) or a non-magnetic insulation material such as alumina).

The shield gap 4 serves to electrically separate the MR element 6 from the area therearound, and is made of a non-magnetic insulation material such as alumina. Such an MR element 6 is the one utilizing GMR (giant magneto-resistive effect), or TMR (tunneling magneto-resistive effect), for example.

The write head section 100B is a perpendicular magnetic write head that performs a recording process in the perpendicular magnetic recording mode. This write head section 100B is configured to include a magnetic layer 8A, an insulation layer 9, a thin-film coil 10 embedded in insulation layers 11 and 13, a leading shield 8B having an end surface exposing to the air bearing surface 30, a main magnetic-pole layer 14, a side gap 15, a pair of side shields 16, a trailing shield 17, a trailing gap 18, an auxiliary magnetic-pole layer 19, an insulation layer 20, a thin-film coil 22 embedded in insulation layers 21 and 23, and a return yoke layer 24, which are laminated in this order on the separation layer 7, for example.

The magnetic layer 8A serves as a return path on the leading side, and is made of a magnetic material such as NiFe, CoNiFe, and others. This magnetic layer 8A leads part of the recording magnetic field, which is from the main magnetic-pole layer 14, to the leading side, so that any WATE (wide adjacent track erase) effective magnetic field is attempted to be reduced. This WATE effective magnetic field denotes any effective magnetic field affecting adjacent tracks of a wide range (for example, two to ten tracks adjacent to a track being a write target).

The thin-film coil 10 is provided mainly for generating magnetic flux for leakage prevention use to prevent any recording-use magnetic flux generated in the thin-film coil 22 from reaching (leaking to) the reproduction head section 100A unexpectedly. Such a thin-film coil 10 is made of a highly-conductive material including copper (Cu), for example, and is so configured as to wind around a back gap BG (in a spiral configuration), as shown in FIGS. 1 and 2. Note that the thin-film coil 10 is not restricted in the number of windings (the number of turns), but the number of windings is preferably the same as the number of turns of the thin-film coil 22.

The insulation layers 11 to 13 are for electrically separating the thin-film coil 10 from the area therearound. The insulation layer 11 is made of a non-magnetic insulation material such as photoresist or SOG (spin on glass) that flows when it is heated, for example. The insulation layers 12 and 13 are each made of a non-magnetic insulation material such as alumina.

The main magnetic-pole layer 14 is for carrying therein the magnetic flux generated in the thin-film coil 22, and emitting the magnetic flux from the air bearing surface 30 to generate the recording magnetic field. Such a main magnetic-pole layer 14 extends from the air bearing surface 30 toward the rear, and is made of a magnetic material with a high saturation magnetic flux density such as iron alloy, for example. Such an iron alloy includes alloy of iron and cobalt (FeCo), or alloy of iron, cobalt, and nickel (FeCoNi), for example.

The main magnetic-pole layer 14 is shaped substantially like a paddle in a planar view as exemplarily shown in FIG. 2. If this is the shape, the main magnetic-pole layer 14 includes a tip end portion 14A and a rear end portion 14B in order from the side of the air bearing surface 30. The tip end portion 14A has a fixed width W1 with which a recording track is defined by width, and the rear end portion 14B has a width W2 wider than the width W1. The tip end portion 14A is a part (magnetic pole) where the recording magnetic field is substantially generated. The rear end portion 14B is increased in width gradually from the width W1 in the front to the width W2, and the width remains the same (width W2) in the rear. The position where the main magnetic-pole layer 14 is increased in width from the width W1 is at a so-called flare point FP. The main magnetic-pole layer 14 is enclosed by the insulation layer 9, the side gap (SG) 15, and the trailing gap 18, and is separated from the leading shield 8B, the side shields 16, and the trailing shield 17.

The side gap 15 is for magnetically separating the main magnetic-pole layer 14 from the pair of side shields 16 in the width direction (width direction of a recording track=X-axis direction) (refer to FIG. 4 that will be described later). Such a side gap 15 is disposed between the main magnetic-pole layer 14 and the pair of side shields 16, and is adjacent to both sides of the main magnetic-pole layer 14 in the width direction (hereinafter, simply referred to as "sides"). Herein, the side gap 15 has the thickness (spacing length of the side gap) of 0.04 μm to 0.15 μm, for example.

The trailing gap 18 is for magnetically separating the main magnetic-pole layer 14 from the trailing shield 17 in the thickness direction (direction intersecting the width direction of a recording track=Y-axis direction), and is referred also to as a write gap. This trailing gap 18 is disposed between the main magnetic-pole layer 14 and the pair of side shields 16, and the trailing shield 17. Note here that the side gap 15 and the trailing gap 18 are each made of a non-magnetic material such as alumina.

The leading shield 8B, the trailing shield 17, and the side shields 16 are mainly for capturing magnetic flux in the vicinity of the air bearing surface 30, and for preventing divergence of the magnetic flux. This accordingly increases the gradient of the recording magnetic field, and reduces the width of the recording track so that the recording magnetic field includes any skewed magnetic field component. The leading shield 8B, the trailing shield 17, and the side shields 16 as such are all extending from the air bearing surface 30 toward the rear, and all end at the flare point FP, for example. With such a configuration, the trailing shield 17 and the side shields 16 are adjacent to the insulation layer 20 in the rear, thereby functioning to define the forefront end position (throat height zero position TP) of the insulation layer 20. The leading shield 8B, the trailing shield 17, and the side shields 16 as such are each made of a magnetic material similar to the material of the main magnetic-pole layer 14, and as shown in FIG. 2, are each shaped rectangular in a planar view with a fixed width W3 wider than the width W2, for example. Herein, as to the detailed configuration of the area in the vicinity of the main magnetic-pole layer 14 on the air bearing surface 30, a description will be given later (refer to FIG. 4).

The auxiliary magnetic-pole layer 19 serves as an auxiliary part for carrying therein any magnetic flux for a supply of the magnetic flux to the main magnetic-pole layer 14. Such an auxiliary magnetic-pole layer 19 may be made of a magnetic material similar to that of the main magnetic-pole layer 14, or may be made of a magnetic material different therefrom. This auxiliary magnetic-pole layer 19 is extending backward from the position behind the air bearing surface 30 on the trailing side of the main magnetic-pole layer 14, and then is coupled to the main magnetic-pole layer 14. The auxiliary magnetic-pole layer 19 is shaped rectangular in a planar view with the width W2 as shown in FIG. 2, for example.

The insulation layer 20 is for defining a throat height TH being an important factor for determining the recording characteristics of the thin-film magnetic head, and is disposed between the auxiliary magnetic-pole layer 19, the trailing shield 17, and the side shields 16. The forefront end position of this isolation layer 20 is the throat height zero position TP as described above, and this throat height zero position TP is away from the air bearing surface 30 by the throat height TH. This insulation layer 20 is made of a non-magnetic insulation material such as alumina. Note that FIGS. 1 and 2 each show a case where the throat height zero position TP matches the flare point FP.

The thin-film coil 22 is for generating magnetic flux for recording use, and in the thin-film coil 22, a current flow is opposite in direction from that in the thin-film coil 10, for example. The detailed configuration of the thin-film coil 22 is the same as that of the thin-film coil 10, for example. As an alternative to such thin-film coils 10 and 22 each in the above-described spiral configuration of winding in the lamination plane, used may be a helical coil in a configuration of winding around the main magnetic-pole layer 14 and the auxiliary magnetic-pole layer 19 toward the Y-axis direction.

The insulation layers 21 and 23 are for electrically separating the thin-film coil 22 from the area therearound, and are both coupled to the insulation layer 20. The insulation layer 21 is made of a non-magnetic insulation material similar to that of the insulation layers 12 and 13, for example, and the insulation layer 23 is made of a non-magnetic isolation material similar to that of the insulation layer 11, for example. The forefront ends of the insulation layers 21 and 23 are both behind the forefront end of the insulation layer 20, for example.

The return yoke layer 24 is mainly for capturing the magnetic flux returning to the write head section 100B from the recording medium 40, and for circulating the magnetic flux therebetween. Such a function of circulating the magnetic flux is not served only by the return yoke layer 24 but also by the side shields 16 and the trailing shield 17 each being a writing shield. The return yoke layer 24 is positioned on the trailing side of the side shields 16, the trailing shield 17, and the auxiliary magnetic-pole layer 19, and is extending from the air bearing surface 30 being a starting point toward the rear. The return yoke layer 24 is coupled to the trailing shield 17 in the front thereof, and is coupled to the auxiliary magnetic-pole layer 19 in the back gap BG in the rear. Moreover, the return yoke layer 24 is made of a magnetic material similar to that of the main magnetic-pole layer 14, and as shown in FIG. 2, is shaped rectangular with the width W3 in a planar view, for example. Note here that the return yoke layer 24 may be made of a magnetic material different from that of the main magnetic-pole layer 14.

[Configuration of Main Part of Thin-Film Magnetic Head]

By referring to FIG. 4, described in detail next is the configuration of the main part of the thin-film magnetic head. FIG. 4 shows the main part of the thin-film magnetic head of FIGS. 1 to 3, showing the configuration of their end surfaces on the side of the air bearing surface 30. In FIG. 4, for ease of distinction among the components, any component made of a material not including an insulation material is hatched.

As to the leading shield 8B, the insulation layer 13 serving as a leading gap, the tip end portion 14A, the side gap 15, the side shields 16, the trailing gap 18, and the trailing shield 17, their end surfaces are all exposed to the air bearing surface 30. This expression of "their end surfaces are all exposed to the air bearing surface 30" means that the end surfaces of the above components are all positioned in the plane of the air bearing surface 30.

In the air bearing surface 30, the tip end portion 14A is so configured that one end surface thereof on the trailing side is wider in width than the other end surface thereof on the leading side. More in detail, the end surface of the tip end portion 14A has an end edge positioned on the trailing side (trailing edge TE), an end edge positioned on the leading side (leading edge LE), and two end edges positioned therebetween (side edges SE). As such, the end surface of the tip end portion 14A is in such a shape that the trailing edge TE has the width W1 wider than a width W4 of the leading edge LE. This trailing edge TE is a substantial recording portion in the tip end portion 14A, and the width W1 thereof is 0.2 μm or smaller. Herein, the side edges SE may be each or both straight, curved, or bent.

As to the end surface of this tip end portion 14A, the relationship of W1>W4 and W1≧W5 is satisfied when a comparison is made between the widths W1 and W4 and a width W5 at any arbitrary position between the trailing edge TE and the leading edge LE. In this case, the width W4 may be larger than 0, or may be substantially 0. When the width W4 is larger than 0, it means that the end surface is shaped to include the leading edge LE on one side. On the other hand, when the width W4 is substantially 0, it means that the end surface is shaped to include the leading edge LE at a corner vertex.

Figure 4:
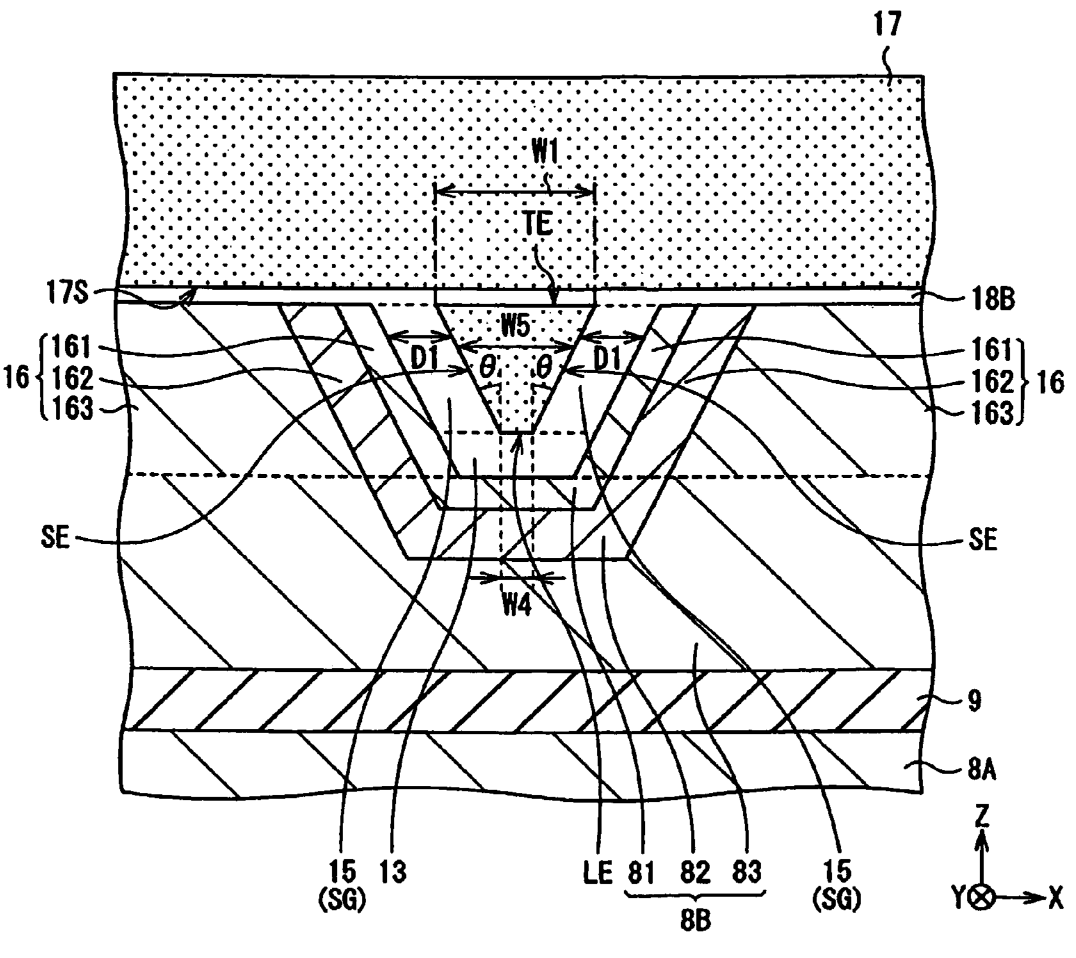
FIG. 4 is an enlarged plan view of the thin-film magnetic head of FIG. 1, showing the configuration of the main part of an end surface being an air bearing surface.

FIG. 4 shows an example in which the end surface of the tip end portion 14A is in a trapezoid shape (inverted trapezoid) with the trailing edge TE and the leading edge LE respectively being the top base (longer side) and the bottom base (shorter side). In this case, the bevel angle θ (angle of the base angle) is not specifically restrictive.

The leading shield 8B, the side shields 16, and the trailing shield 17 are enclosing the tip end portion 14A via the insulation layer 13, the side gap 15, and the trailing gap 18 from four directions from the leading side, both sides in the width direction of the recording track (X direction), and the trailing side. In this configuration, the side shields 16 are both in contact with the leading shield 8B but are separated from the trailing shield 17 by the trailing gap 18.

As to a surface 17S of the trailing shield 17 opposing the tip end portion 14A and the side shields 16, any area portion at least opposing the tip end portion 14A is preferably formed flat on the surface. This is because the pattern of recording bits (the recording bit pattern) to be derived during recording may remain linear thereby, and thus the resulting track density and linear recording density may be higher easily.

In this example, in the air bearing surface 30, a space D1 in the side gap 15 (distance between the tip end portion 14A and the side shields 16 in the width direction) may be fixed or varied in the thickness direction.

The pair of side shields 16 are each so configured as to have the saturation magnetic flux density, which is increased in value with distance from the tip end portion 14A in the cross track direction (X-axis direction) with a base point being a point closest to the tip end portion 14A. To be specific, the pair of side shields 16 are each divided into first to third area portions 161 to 163 in order from the position closest to the tip end portion 14A, and these first to third area portions 161 to 163 have each different values of the saturation magnetic flux density. That is, the first area portion 161 closest to the tip end portion 14A has the lowest value of the saturation magnetic flux density Bs, and the third area portion 163 furthest away from the tip end portion 14A has the highest value of the saturation magnetic flux density. Accordingly, in comparison with a case where the saturation magnetic flux density is fixed in value in the side shields 16, the resulting configuration will be advantageous to increase not only any perpendicular-component magnetic field in the recording magnetic field but also the component gradient of the perpendicular magnetic field while controlling any ATE (adjacent track erase) effective magnetic field. Herein, the ATE effective magnetic field denotes an effective magnetic field that exerts an influence on any track adjacent to a track being a write target (most adjacent track).

Moreover, the leading shield 8B is so configured that the portion corresponding to the tip end portion 14A in the down track direction (Z-axis direction) shows the saturation magnetic flux density increasing with distance from the tip end portion 14A. To be specific, the leading shield 8B is divided into first to third area portions 81 to 83 in order from the position closest to the tip end portion 14A. The first area portion 81 closest to the tip end portion 14A has the lowest value of the saturation magnetic flux density, and the third area portion 83 furthest away from the tip end portion 14A has the highest value of the saturation magnetic flux density. Especially, the material of the first to third area portions 81 to 83 preferably is the one leading to the values of the saturation magnetic flux density same as those of the first to third area portions 161 to 163. The first to third area portions 81 to 83, and the first to third area portions 161 to 163 may be made of alloy of nickel and iron (NiFe), alloy of cobalt, nickel, and iron (CoNiFe), alloy of cobalt and iron (CoFe), or others. By changing the alloy composition as appropriate, the saturation magnetic flux density in the area portions may be accordingly adjusted. When the first area portions 81 and 161 are both made of $Ni_{83}Fe_{17}$ (saturation magnetic flux density Bs=0.9 $Wb/m^2$), for example, the second area portions 82 and 162 may be both made of $Ni_{76}Fe_{24}$ (saturation magnetic flux density Bs=1.1 $Wb/m^2$), and the third area portions 83 and 163 may be both made of $Ni_{50}Fe_{50}$ (saturation magnetic flux density Bs=1.5 $Wb/m^2$).

[Configuration of Recording Medium]

Figure 5:
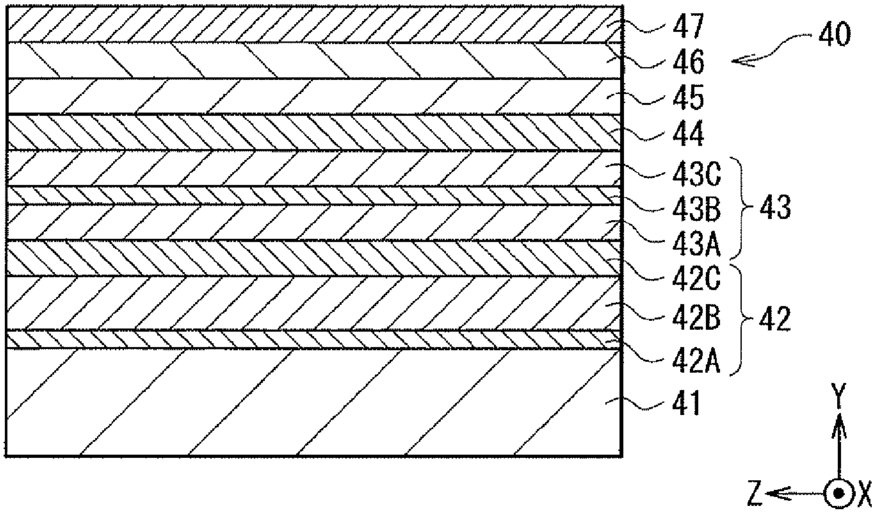
FIG. 5 is a cross-sectional view of the configuration of a recording medium.

Described next is the specific configuration of the recording medium 40. FIG. 5 shows the cross sectional configuration of the recording medium 40.

The recording medium 40 is configured to include a flux path layer 42, a soft magnetic backing layer 43, a non-magnetic layer 44, a hard magnetic recording layer 45, a protection layer 46, and a lubrication layer 47, which are laminated in this order on a substrate 41. The flux path layer 42 functions as a path for magnetic flux flowing in the recording medium 40, and is the one configured by non-magnetic layers 42A and 42C, which are so laminated as to sandwich a soft magnetic layer 42B therebetween, for example. The soft magnetic backing layer 43 is the one configured by soft magnetic layers 43A and 43C, which are so laminated as to sandwich a non-magnetic layer 43B. The hard magnetic recording layer 45 is magnetized (magnetically recorded with information) by the recording magnetic field.

The substrate 41 is an aluminum disk with nickel phosphorus (NiP) plating, for example, and the thickness thereof is arbitrary. In the flux path layer 42, the non-magnetic layer 42A is made of titanium (Ti: thickness of about 1 nm), the soft magnetic layer 42B is made of alloy of cobalt, nickel, and iron (CoNiFe: thickness of about 100 nm to 200 nm), and the non-magnetic layer 42C is made of nickel phosphide (thickness of about 100 nm), for example. Such a flux path layer 42 has the magnetic permeability higher than that of the soft magnetic backing layer 43. This is because the magnetic field (recording magnetic field) from the thin-film magnetic head is strongly pulled toward the recording medium 40 so that the performance capabilities for recording may be improved. Moreover, it is less concerned about the instability of recording (e.g., erasing of any adjacent track) because it is disposed away from the hard magnetic recording layer 45, the magnetic interaction with the hard magnetic recording layer 45 is thus low in level. In the soft magnetic backing layer 43, the soft magnetic layer 43A is made of boride alloy of iron, cobalt, zirconium, and tantalum (FeCoZrTaB: thickness of about 50 nm), the non-magnetic layer 43B is made of ruthenium (Ru: thickness of about 0.8 nm), and the soft magnetic layer 43C is made of boride alloy of iron, cobalt, zirconium, and tantalum (thickness of about 50 nm), for example. The non-magnetic layer 44 is made of a mixture of alloy of ruthenium and chromium (RuCr), and silicon oxide ($SiO_2$) (thickness of about 30 nm), for example. The hard magnetic recording layer 45 is made of a mixture of alloy of cobalt, platinum, and chromium (CoPtCr), and silicon oxide (thickness of about 25 nm), for example. The protection layer 46 is made of carbon (thickness of about 2 nm), for example. Note that the configuration of the recording medium 40 is not necessarily restricted to the configuration described above.

[Operation of Thin-Film Magnetic Head]

This thin-film magnetic head is operated as below.

During information recording, when the thin-film coil 22 in the write head section 100B is provided with a current flow from an external circuit that is not shown, magnetic flux J for recording use (refer to FIG. 2) is generated. This magnetic flux J is once stored in the main magnetic-pole layer 14 and the auxiliary magnetic-pole layer 19, and then flows inside of the main magnetic-pole layer 14 toward the tip end portion 14A. At this time, the magnetic flux J is narrowed at the flare point FP, and thus is eventually directed mainly to the vicinity of the trailing edge TE. When this magnetic flux J is emitted to the outside, the recording magnetic field is generated, and by the resulting recording magnetic field, the hard magnetic recording layer 45 is magnetized so that the recording medium 40 is magnetically recorded with information.

In such a thin-film magnetic head, a current flow is so provided as to be opposite in direction in the thin-film coils 10 and 22, and thus the magnetic flux to be generated therein is also opposite in direction from each other. More in detail, the magnetic flux to be generated in the thin-film coil 22 for recording use is generated in the direction toward the leading side, but the magnetic flux to be generated in the thin-film coil 10 for leakage prevention use is generated in the direction toward the trailing side. As a result, the magnetic flux generated for recording use is prevented from being leaked to the reproduction head section 100A, thereby being able to prevent any reduction of detection accuracy in the MR element 6. Moreover, any information recorded on the recording medium 40 may be also prevented from being erased unexpectedly due to any unwanted magnetic field resulted from the magnetic field for recording use being captured in the lower lead shield 3 and the upper lead shield 5.

When the magnetic flux J is emitted from the tip end portion 14A, a part (divergence component) of the magnetic flux J is captured by the trailing shield 17, the side shield 16, and the leading shield 8B. This accordingly prevents any increase in size of the recording magnetic field, and increases the gradient of the recording magnetic field. The magnetic flux J captured as such in the trailing shield 17, and the side shields 16A and 16B is supplied again to the main magnetic-pole layer 14 after going through the return yoke layer 24.

Herein, the magnetic flux J emitted from the main magnetic-pole layer 14 to the recording medium 40 magnetizes the hard magnetic recording layer 45, and then is returned to the return yoke layer 24 via the flux path layer 42 before being supplied again to the main magnetic layer 14. As such, the magnetic flux J is circulated between the write head section 100B and the recording medium 40 so that a magnetic circuit is constructed.

On the other hand, during reproduction of information, in response to a sense current flowing to the MR element 6 of the reproduction head section 100A, the MR element 6 varies in resistance in accordance with a signal magnetic field in the recording medium 40 for reproduction use. Such a variation of resistance is detected as a voltage change, and thus the information recorded on the recording medium 40 is magnetically reproduced.

[Manufacturing Method of Thin-Film Magnetic Head]

Described next is a manufacturing method of the thin-film magnetic head. FIGS. 6 to 14 are each for illustrating a process of forming the main part of the thin-film magnetic head, and showing the cross-sectional configuration of a part shown in FIG. 1A. In the below, described first is the outline of an entire manufacturing process by referring to FIG. 1, and a process of forming the main part is described in detail by referring to FIGS. 1 to 14. In the below, the details about a series of components including their materials, sizes, shapes, and others, are already described, and thus such a description is not given again if appropriate.

This thin-film magnetic head is manufactured mainly by forming and laminating a series of components using any existing thin-film process. Such an existing thin-film process includes the film forming technology such as electrolytic plating or sputtering, the patterning technology such as photolithography, the etching technology such as dry etching or wet etching, and the polishing technology such as CMP (chemical mechanical polishing), for example.

For manufacturing the thin-film magnetic head, as shown in FIG. 1, first of all, the substrate 1 is formed thereon with the insulation layer 2. The resulting insulation layer 2 is then formed thereon, by lamination, with the lower lead shield 3, the shield gap layer 4 embedding the MR element 6, and the upper lead shield 5 in this order so that the reproduction head section 100A is formed. Thereafter, on the resulting reproduction head section 100A, the reproduction layer 7 is formed. The resulting separation layer 7 is then formed in order with the magnetic layer 8A, the insulation layer 9, and the thin-film coil 10 embedded in the insulation layers 11 and 12. Thereafter, in such a manner as to cover entirely the insulation layers 9, 11, and 12, and the thin-film coil 10, formed in order are the insulation layer 13 and the main magnetic-pole layer 14. The side gap 15 and the trailing gap 18 are then formed together with the leading shield 8B, the side shields 16, the trailing shield 17, and the auxiliary magnetic-pole layer 19. Between the trailing shield 17 and the auxiliary magnetic-pole layer 19, the insulation layer 20 is then formed. The trailing shield 17, the auxiliary magnetic-pole layer 19, and the insulation layer 20 formed as such are then made flat on the surface, and the resulting flat surface is then formed thereon with the thin-film coil 22 embedded in the insulation layers 21 and 23. Thereafter, on the trailing shield 17, the auxiliary magnetic-pole layer 19, and the insulation layer 20, the return yoke layer 24 is formed so that the write head section 100B is formed. Lastly, after forming the overcoat layer 25 on the write head section 100B, the resulting laminate structure from the substrate 1 on the bottom to the overcoat layer 25 at the top is collectively subjected to polishing on one side by the CMP or others, thereby forming the air bearing surface 30. In such a manner, the thin-film magnetic head is completed.

[Manufacturing Method of Main Part in Thin-Film Magnetic Head]

Figure 6:
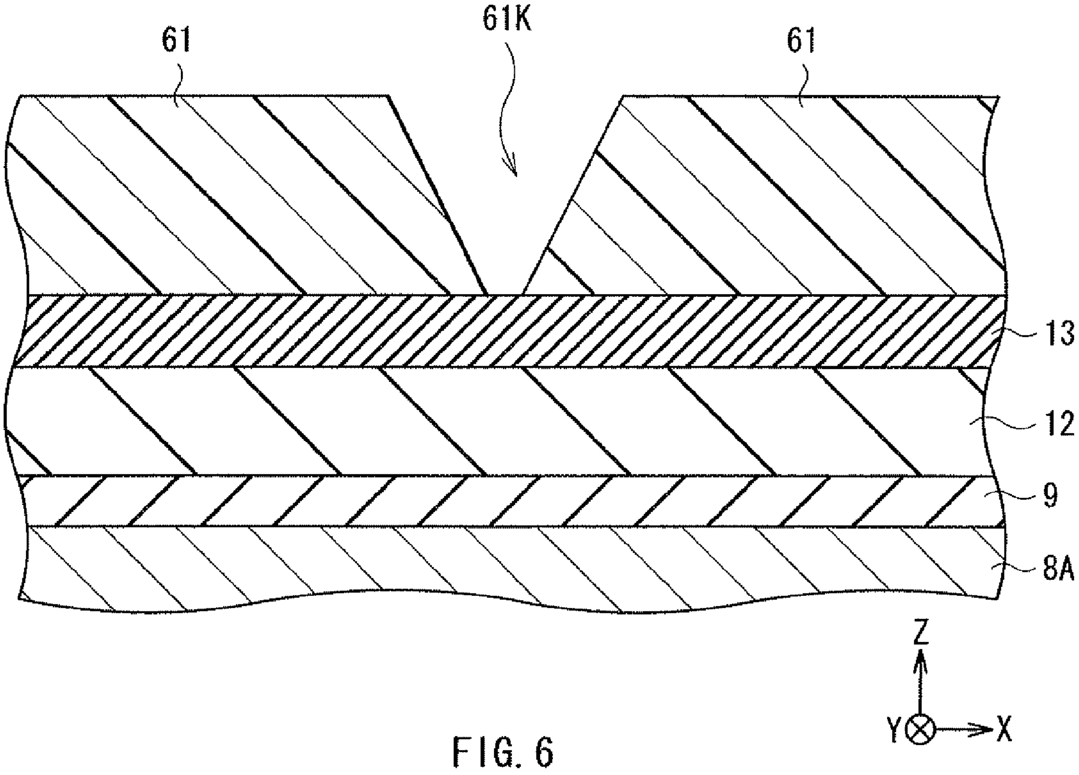
FIG. 6 is a cross-sectional view of the main part of the thin-film magnetic head for illustrating a manufacturing process thereof.

The main part of the thin-film magnetic head is formed as below, for example. First of all, as shown in FIG. 6, on the insulation layer 13 being a substrate, a photoresist pattern 61 is formed with an aperture section 61K. In this example, the insulation layer 13 is applied with a coating of photoresist on the surface to form the photoresist layer, and the photoresist film is then subjected to patterning by the photolithography, i.e., light exposure and development. At this time, the insulation layer 13 is so configured as to be exposed to the aperture section 61K, and the aperture section 61K is to increase in width not on the side close to the insulation layer 13 but on the side away therefrom.

Figure 7:
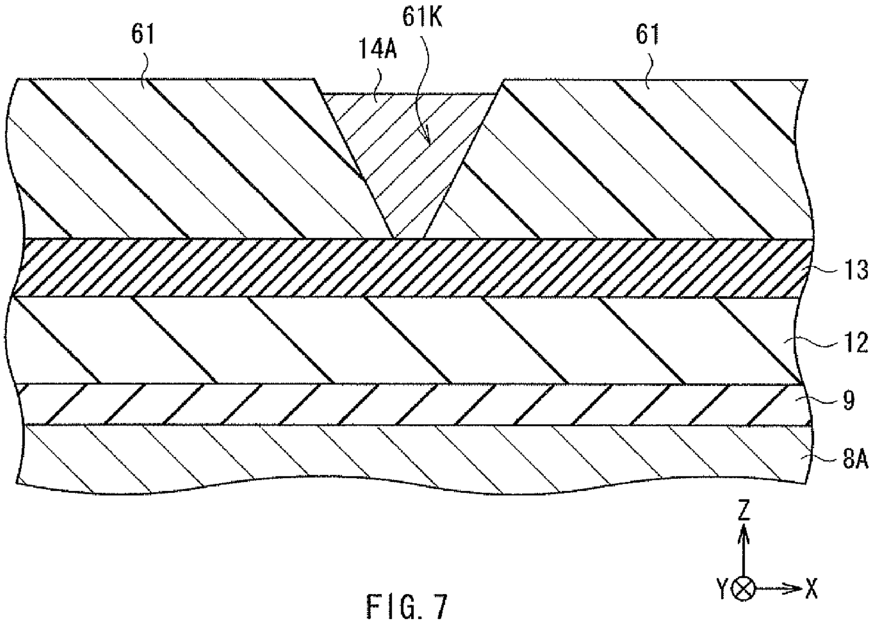
FIG. 7 is a cross-sectional view for illustrating a process subsequent to the process of FIG. 6.

Next, as shown in FIG. 7, the aperture section 61K is formed with the tip end portion 14A by the electrolytic plating, for example. In this case, after forming a seed layer (not shown), a plating film is grown using the seed layer as an electrode film, for example. Herein, alternatively to the electrolytic plating, the sputtering or others may be used.

Figure 8:
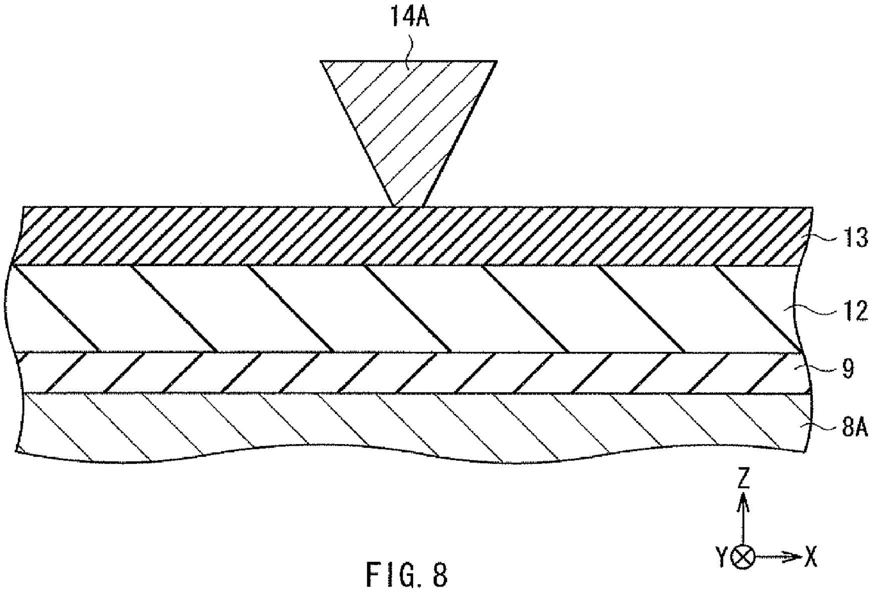
FIG. 8 is a cross-sectional view for illustrating a process subsequent to the process of FIG. 7.

The photoresist pattern 61 is then removed to expose both side surfaces of the tip end portion 14A as shown in FIG. 8.

Figure 9:
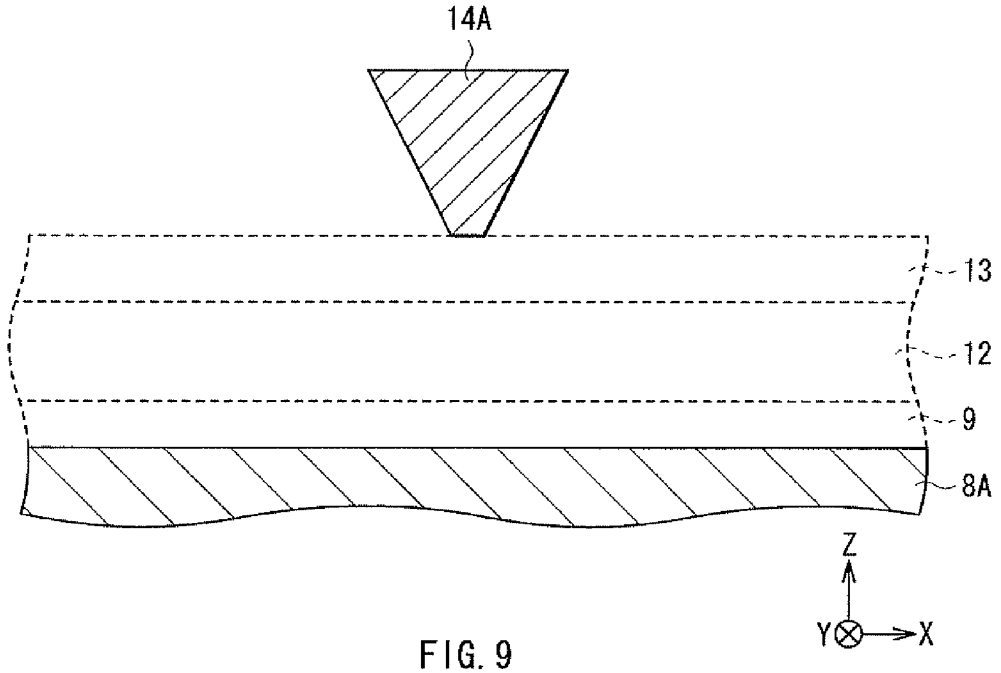
FIG. 9 is a cross-sectional view for illustrating a process subsequent to the process of FIG. 8.

Next, as shown in FIG. 9, any area of the insulation layers 12 and 13 overlapping the tip end portion 14A in the thickness direction (Z-axis direction) is selectively removed together with any area on both sides of the removed area. Specifically, removed entirely is any area of the insulation layers 9, 12, and 13 within the range of the width W3 of FIG. 2 including the tip end portion 14A in the width direction of the recording track (X-axis direction). When the insulation layers 9, 12, and 13 are all made of alumina, for example, such areas are removed by dissolving using a predetermined solvent (e.g., alkaline solution). As a result, the surface of the magnetic layer 8A is exposed, and the tip end portion 14A is made hollow inside.

Figure 10:
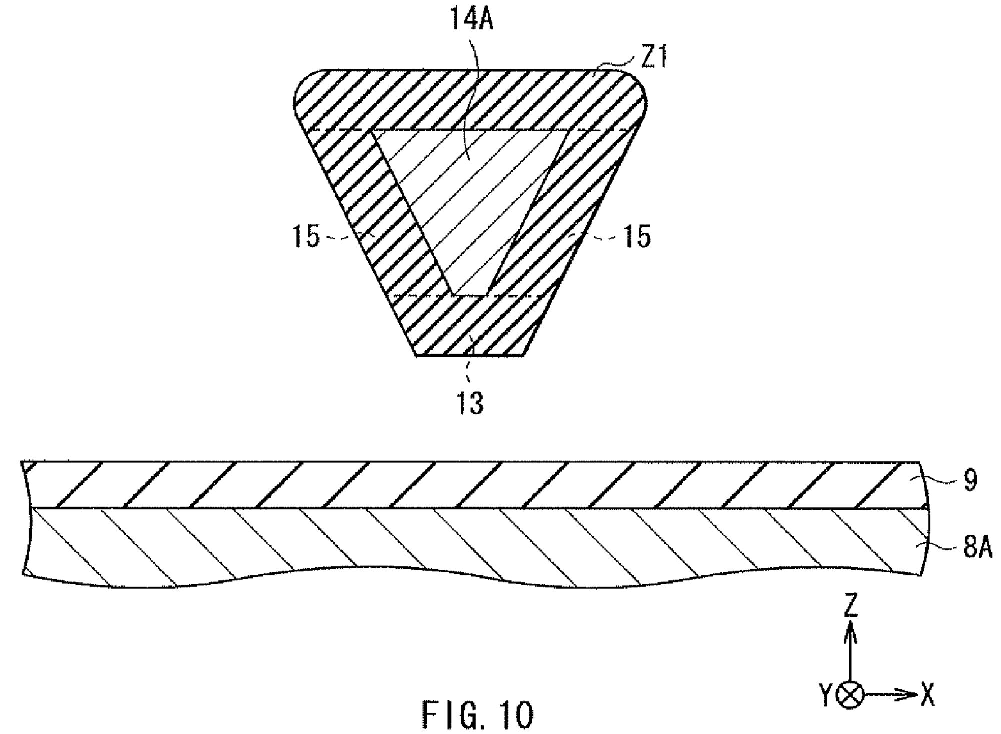
FIG. 10 is a cross-sectional view for illustrating a process subsequent to the process of FIG. 9.

After removing the areas of the insulation layers 9, 12, and 13 in the vicinity of the tip end portion 14A, as shown in FIG. 10, the tip end portion 14A is applied therearound with an insulation material such as alumina by CVD (chemical vapor deposition) or ALD (atomic layer deposition). As a result, formed is an insulation film Z1, including a portion serving later as the side gap 15, and a portion serving later as the insulation layer 13 being a leading gap. At this time, the magnetic layer 8A is also piled up with the insulation material on the surface so that the insulation layer 9 is formed again.

Figure 11:
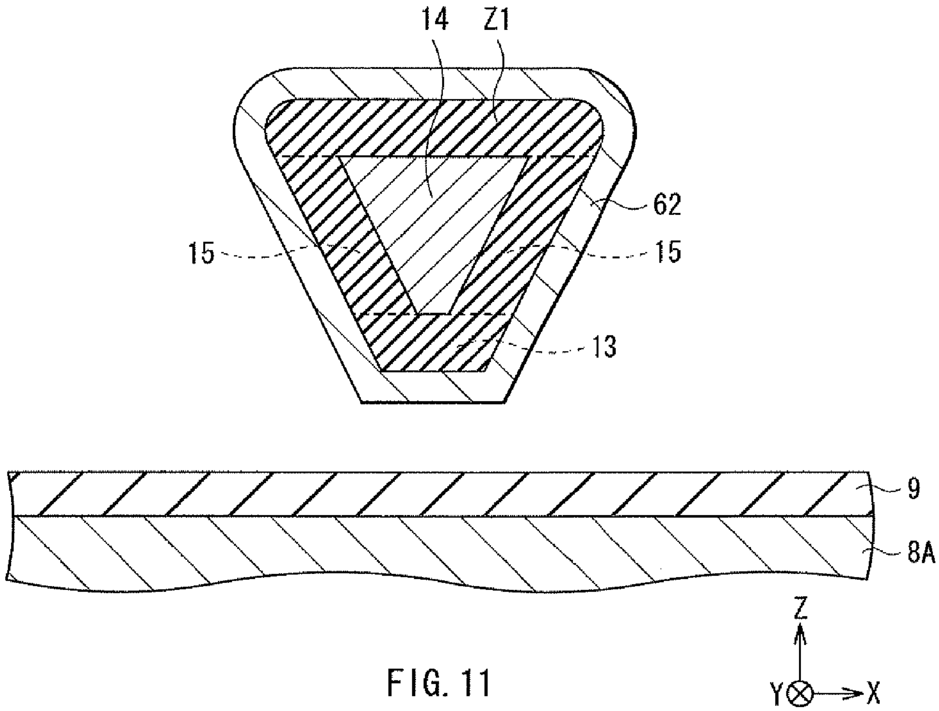
FIG. 11 is a cross-sectional view for illustrating a process subsequent to the process of FIG. 10.

Thereafter, in such a manner as to cover the insulation film Z1 enclosing the tip end portion 14A, a magnetic layer 62 serving later as the first area portions 81 and 161 is formed by the sputtering, for example (FIG. 11). At this time, for the magnetic layer 62 to be piled up to fully cover the both side surfaces of the tip end portion 14A, using the substrate bias sputtering, or the ion beam sputtering with which ion beams directed to a substance to be deposited is changed in angle is preferable. Herein, the substrate bias sputtering is the sputtering with which a direct-current electric field or an RF electric field is applied to a substrate, and is a method for reducing the mean free path is reduced for sputtering particles coming from a target to be sputtered, thereby allowing the piling up of a depositing substance also to any portion not visible in the direction from which the sputtering particles come.

Figure 12:
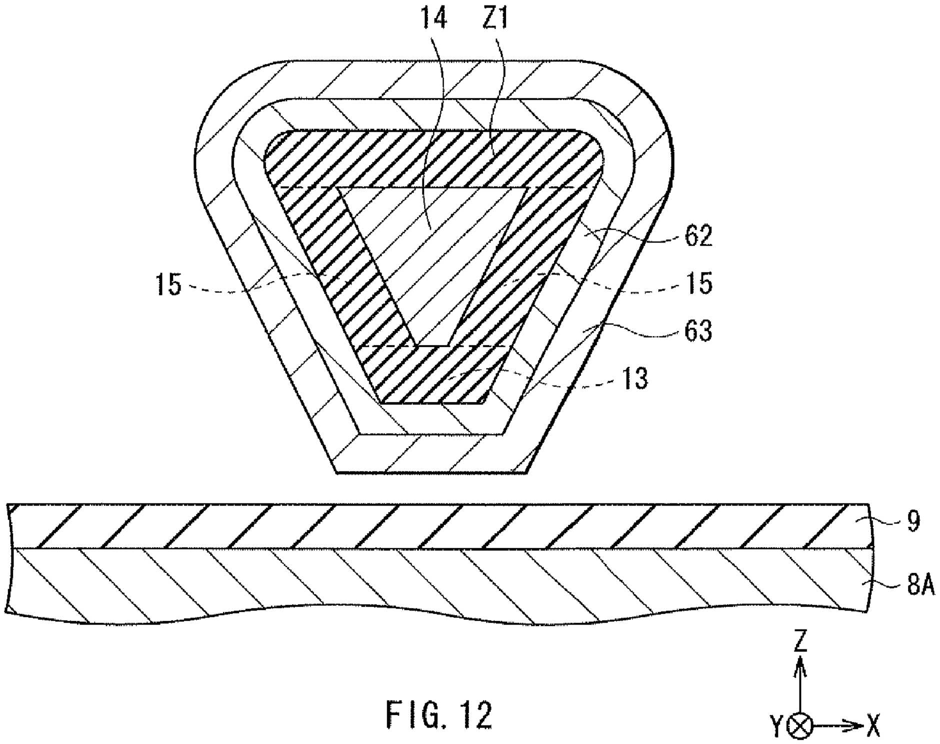
FIG. 12 is a cross-sectional view for illustrating a process subsequent to the process of FIG. 11.

Next, as shown in FIG. 12, in such a manner as to cover the magnetic layer 62, formed is a magnetic layer 63 that serves later as the second area portions 82 and 162. In this example, the magnetic layer 63 may be formed by the electrolytic plating using the magnetic layer 62 as a plating base film (plating electrode film).

Figure 13:
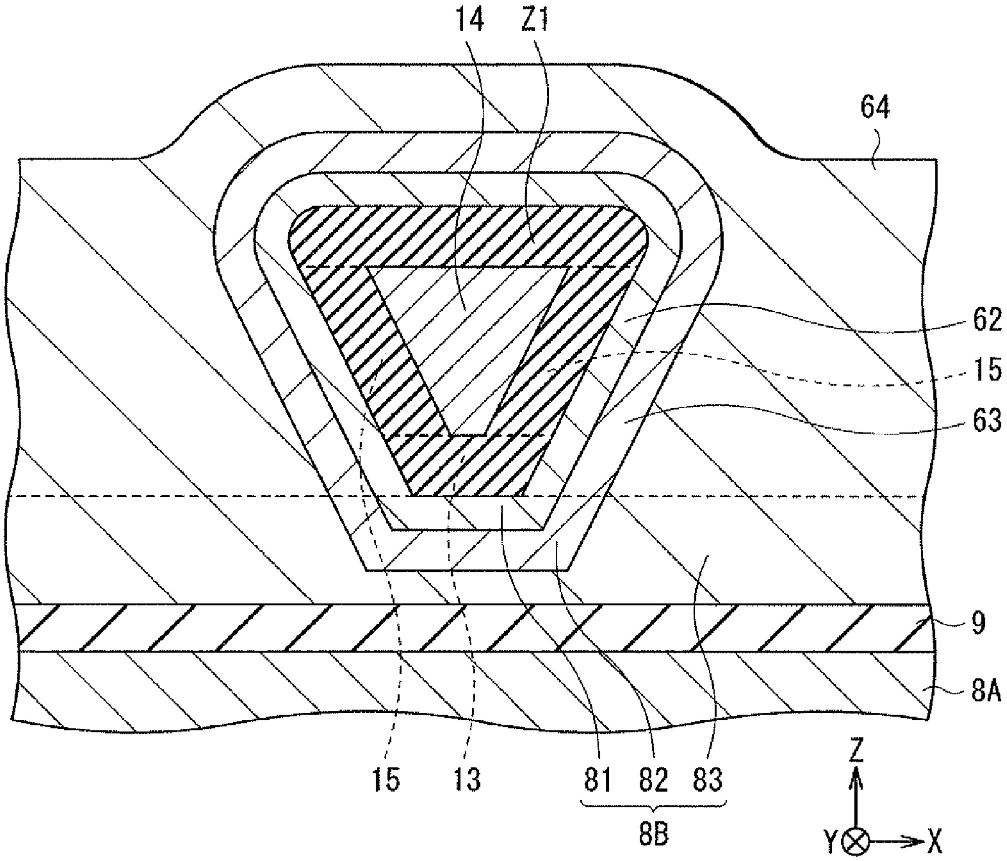
FIG. 13 is a cross-sectional view for illustrating a process subsequent to the process of FIG. 12.

Moreover, as show in FIG. 13, formed next is a magnetic layer 64 by the electrolytic plating or others in such a manner as to cover the structure in its entirety. In the magnetic layer 64, any portion positioned closer to the leading side than the insulation layer 13 (any portion in contact with to the insulation layer 9) serves as the third area portion 83 being a part of the leading shield 8B. As such, the leading shield 8B including the first to third area portions 81 to 83 is completely formed.

Figure 14:
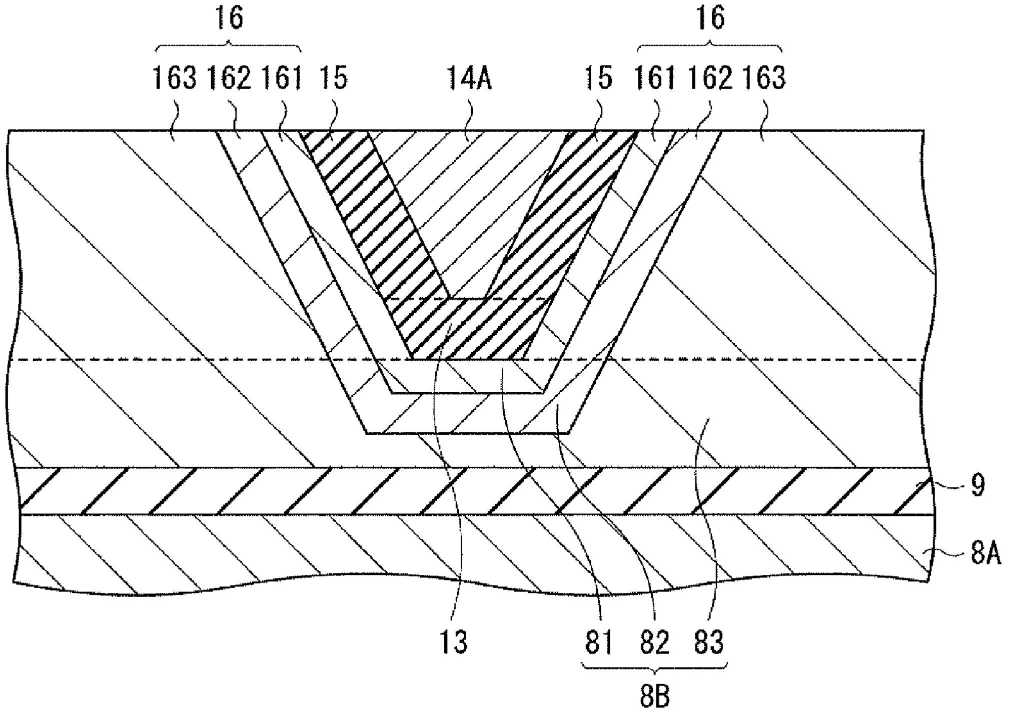
FIG. 14 is a cross-sectional view for illustrating a process subsequent to the process of FIG. 13.

Thereafter, by CMP (chemical mechanical polishing) or the milling, for example, the magnetic layers 62 to 64, and the insulation film Z1 are made flat by polishing until the tip end portion 14A is exposed. In this case, in order to expose the tip end portion 14A without fail, such layers may be excessively polished if needed. As a result, as shown in FIG. 14, the side gap 15 and the insulation layer 13 both become visible, and the pair of side shields 16 respectively including the first to third area portions 161 to 163 are formed on both sides of the tip end portion 14A each via the side gap 15.

On the tip end portion 14A, the side gap 15, and the side shields 16, the trailing gap 18 and the trailing shied 17 are formed in order by the sputtering, for example. As such, the main part of the thin-film magnetic head is completely formed.

[Advantages and Effects of Thin-Film Magnetic Head]

In the thin-film magnetic head in this embodiment, the leading shield 8B and the pair of side shields 16 are enclosing the tip end portion 14A of the main magnetic-pole layer 14 via the insulation layer 13 and the side gap 15, and are each divided into the first to third area portions 161 to 163 or into the first to third area portions 81 to 83 having each different values of the saturation magnetic flux density. Herein, the first to third area portions 161 to 163 or the first to third area portions 81 to 83 are each so configured as to have the optimal saturation magnetic flux density Bs, specifically, to have the saturation magnetic flux density that increases in value with distance from the tip end portion 14A with a base point being a point closest to the tip end portion 14A. Such a configuration allows any divergence component of the magnetic flux to be easily captured in the area in proximity to the tip end portion 14A, but prevents the magnetic flux from being captured too much in the remaining area. Accordingly, the recording magnetic field is ensured to be adequate in intensity at the same time as is prevented from increasing in size so that the recording capabilities may be improved.

More in detail, during the recording process in the perpendicular magnetic recording mode, the magnetic flux flowing inside of the main magnetic-pole layer 14 is directed to flow into the tip end portion 14A after being narrowed at the flare point FP as described above, and thus the magnetic flux shows a tendency to be diverged in the vicinity of the tip end of the tip end portion 14A. Especially such a tendency becomes obvious in the area proximity to the trailing edge TE. For preventing the recording magnetic field from being diverged as such, by bringing the side shields 16 close to the tip end portion 14A in the cross track direction (width direction of the recording track), capturing sufficiently the divergence component of the magnetic flux by the side shields 16 is considered effective. However, when the side shields 16 have the saturation magnetic flux density Bs fixed in value, bringing such side shields 16 close to the tip end portion 14A reduces the intensity of the recording magnetic field (especially the perpendicular-component magnetic field). In consideration thereof, as in this embodiment, in the side shields 16, compared with the first area 161 closest to the tip end portion 14A, the second area portion 162 a little away from the tip end portion 14A is so configured as to have the saturation magnetic flux density Bs relatively higher. Such a configuration may prevent any excessive capturing of magnetic flux while preventing any divergence of the recording magnetic field with a good efficiency, thereby being able to prevent any intensity reduction of the recording magnetic field. Moreover, by forming the leading shield 8B with a gradient of the saturation magnetic flux density Bs also in the down track direction, especially by setting the saturation magnetic flux density Bs in the second area portion 82 a little away from the tip end portion 14 to be relatively higher than that in the first area 81 closest to the tip end portion 14A, the same effects may be achieved.

As such, in this embodiment, the recording magnetic field is ensured to be adequate in intensity at the same time as is prevented from increasing in size. Moreover, during recording, the recording magnetic field has a difficulty in reaching any adjacent track. This accordingly prevents the adjacent track(s) from being erased unexpectedly, and the recording bits may be increased in quality because the recording bit pattern P is narrowed and becomes linear. As such, the track density and the linear recording density may be both increased while the recording magnetic field is ensured to be adequate in intensity so that the recording capabilities may be improved.

[Configuration of Magnetic Recording Device Incorporating Thin-Film Magnetic Head]

Figure 15:
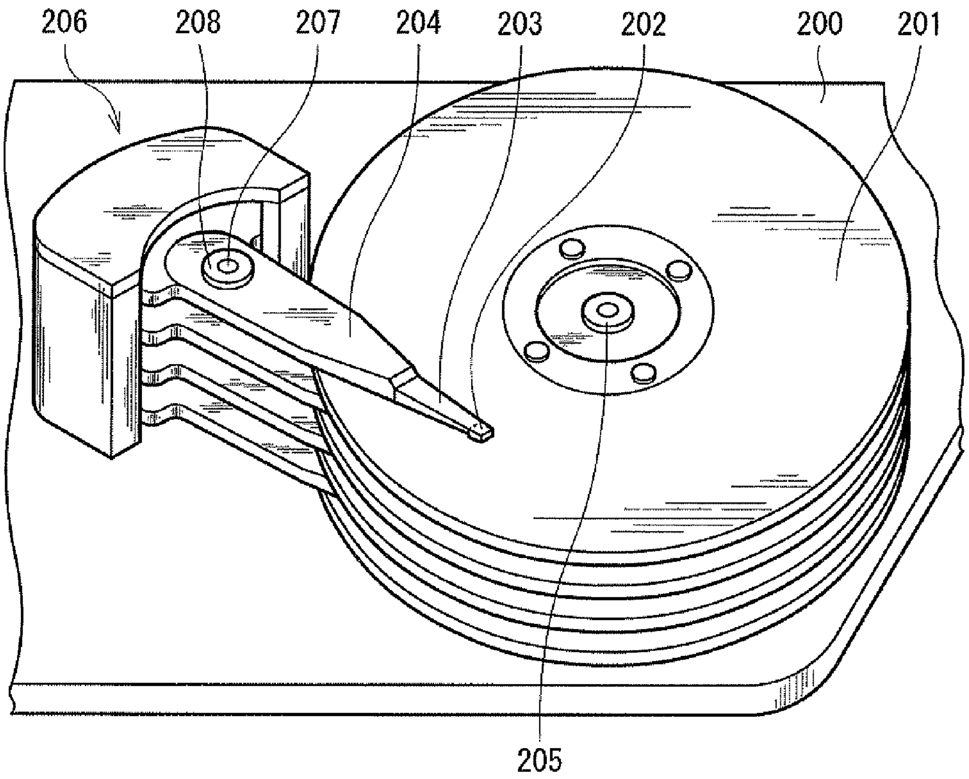
FIG. 15 is a perspective view of the configuration of a magnetic recording device incorporating the thin-film magnetic head.
Figure 16:
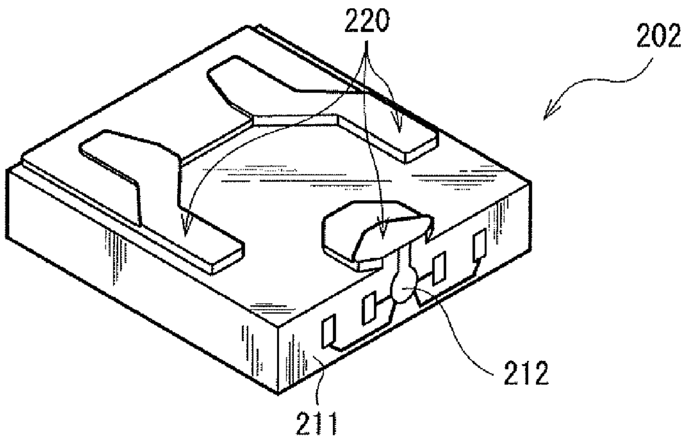
FIG. 16 is an enlarged perspective view of the configuration of a main part of the magnetic recording device.

Described next is the configuration of a magnetic recording device incorporating the thin-film magnetic head. FIGS. 15 and 16 each show the configuration of the magnetic recording device, specifically, FIG. 15 is a perspective view of the entire configuration thereof, and FIG. 16 is a perspective view of the configuration of the main part thereof.

This magnetic recording device is exemplified by a hard disk drive, and is configured by a chassis 200 as shown in FIG. 15. The chassis 200 includes therein a plurality of magnetic disks (hard disks) 201 each corresponding to the recording medium 40 (refer to FIG. 3), a plurality of suspensions 203, and a plurality of arms 204. The suspensions 203 are so disposed as to correspond to the magnetic disks 201, and each support its corresponding magnetic head slider 202 at its end portion. The arms 204 are each for supporting the remaining end portion of its corresponding suspension 203. The magnetic disks 201 are each configured to be able to rotate about a spindle motor 205 fixed to the chassis 200. The arms 204 are connected to a drive section 206 being a power source, and are configured to be able to swing about a fixed shaft 207 via a bearing 208. The fixed shaft 207 herein is fixed to the chassis 200. The drive section 206 includes a drive source such as voice coil motor. Such a magnetic recording device is of a model in which a plurality of arms 204 may swing all together about the fixed shaft 207. Note that, in FIG. 15, for easy viewing of the internal configuration of the magnetic recording device, the chassis 200 is partially notched.

The magnetic head slider 202 is configured by a thin-film magnetic head 212 attached entirely over one surface of a substrate 211 as shown in FIG. 16, for example. The thin-film magnetic head 212 is the thin-film magnetic head described above, and the substrate 211 is made of a non-magnetic insulation material such as AlTiC is substantially a rectangular parallelepiped. On another surface of the substrate 211, i.e., air bearing surface 220, is configured to have bumps and dips for reduction of air resistance to be caused during the swing movement of the arms 204. The surface orthogonal to such an air bearing surface 220 (surface on the front right side in FIG. 27) is the one attached with the thin-film magnetic head 212. The magnetic head sliders 202 are each so configured as to move upward from the recording surface of its corresponding magnetic disk 201 when the magnetic disk 201 rotates during recording or reproduction of information. Such an upward movement occurs by flow of air generated between the recording surface of the magnetic disk 201 (the surface opposing the magnetic head slider 202), and the air bearing surface 220. Herein, for easy viewing of the configuration of the magnetic head slider 202 on the side of the air bearing surface 220, FIG. 16 shows the upside-down state of the state of FIG. 15.

With such a magnetic recording device, any of the arms 204 is moved to swing during recording or reproduction of information so that the corresponding magnetic head slider 202 is moved to any predetermined area (recording area) of the corresponding magnetic disk 201. Thereafter, when power is applied to the thin-film magnetic head 212 in the state of opposing the magnetic disk 201, based on the operation principles described above, the thin-film magnetic head 212 subjects the magnetic disk 201 to the recording or reproduction process.

With the magnetic recording device, the above-described thin-film magnetic head is provided so that the recording capabilities may be improved.

EXAMPLES

Next, described in detail are specific examples of the invention.

Experiment Examples 1 to 4

The thin-film magnetic head of the configuration of FIG. 4 is manufactured. For forming the main part of the thin-film magnetic head, the tip end portion 14A, the leading shield 8B, the trailing shield 17, and the side shields 16 are formed by growing a plating film of alloy of iron and cobalt by the electrolytic plating. At this time, in the leading shield 8B and the side shields 16, the first to third area portions 81 to 83, and the first to third area portions 161 to 163 are so configured as to respectively have the values of saturation magnetic flux density Bs as shown in Table 1. The tip end portion 14A is formed with the thickness of 0.2 μm, the trailing edge TE with the width W1 of 0.09 μm, the leading edge LE with the width W4 of 0.15 μm, and the bevel angle θ of 14°. By depositing alumina by the sputtering, formed are the insulation layer 13, the side gap 15, and the trailing gap 18. In this example, the gap D1 is 0.10 μm, and the trailing gap 18 has the thickness of 0.03 μm. The insulation layer 13 is formed with the thickness of 0.08 μm.

Table 1 shows the result of an experiment conducted on the thin-film magnetic head of each of the examples to check the perpendicular-component magnetic field, the gradient of the perpendicular-component magnetic field in each of the down track direction and the cross track direction, and the ATE effective magnetic field while the thin-film coils 10 and 22 are each provided with a flow of a predetermined recording current (40 mA in this example). In the items of Table 1, characteristics values (of Experiment Example 1) are standardized to 100% assuming that the first to third area portions 81 to 83 and the first to third area portions 161 to 163 all have the same saturation magnetic flux density (Bs=9 $Wb/m^2$). In Table 1, for the items of perpendicular-component magnetic field and gradient of perpendicular-component magnetic field, higher values are preferable. On the other hand, for the item of ATE effective magnetic field, lower values are preferable. Herein, the ATE effective magnetic field is the intensity of the magnetic field (sum of components in all directions) detected at the position away by 0.1 μm in the width direction of the recording track from the center position of the recording track being a write target.

TABLE 1

| | Saturation Magnetic Flux Density (Wb/m$^2$) | | | Perpendicular-Component Magnetic Field (%) | Component Gradient of Perpendicular Magnetic Field | | ATE Effective Magnetic Field (%) |
|---|---|---|---|---|---|---|---|
| | First Area | Second Area | Third Area | | Down Track Direction | Cross Track Direction | |
| Experiment Example 1 | 9 | 9 | 9 | 100.0 | 100.0 | 100.0 | 100.0 |
| Experiment Example 2 | 9 | 11 | 15 | 96.0 | 97.3 | 115.0 | 88.8 |
| Experiment Example 3 | 9 | 13 | 15 | 94.5 | 97.2 | 135.0 | 88.3 |
| Experiment Example 4 | 9 | 15 | 15 | 93.2 | 94.0 | 135.0 | 87.4 |
| Experiment Example 5 | 15 | 15 | 15 | 89.0 | 92.0 | 139.0 | 85.0 |

As shown in Table 1, Experiment Examples 2 to 4 show considerably better values in the item of gradient of perpendicular-component magnetic field (%) in the cross track direction than that in Experiment Example 1. Accordingly, in the recording medium 40, the hard magnetic recording layer 45 corresponding to the recording track being a write target shows the improvement in the state of magnetization at both end portions in the cross track direction, and thus BER (bit error rate) is expected to be better. Moreover, the ATE effective magnetic field also shows the considerable improvement because any unwanted divergence component is removed from the magnetic flux of the recording magnetic field, the squeezing characteristics are expected to be better. That is, the reduction of the ATE effective magnetic fields may also lead to the improvement of the bit error rate of the recording track being a write target during overwrite recording to the adjacent track for a plurality of times (e.g., 100 to 100000 times).

Herein, Experiment Example 5 is carried out with the saturation magnetic flux density being 15 Wb/m$^2$ in all of the first to third area portions 81 to 83 and the first to third area portions 161 to 163, and compared with Experiment Example 1, the ATE effective magnetic field shows the considerable improvement (reduction). However, on the other hand, the recording capabilities may not be satisfactory that much due to the reduction of the perpendicular-component magnetic field of the recording magnetic field, and the reduction of the component gradient of the perpendicular magnetic field in the down track direction. On the other hand, in Experiment Examples 2 to 4, the first area portion 81 and the first area portion 161 closest to the tip end portion 14A of the main magnetic-pole layer 14 are so configured as to have the lowest value of the saturation magnetic flux density, and compared therewith, the second and third areas 82 and 83, and the second and third areas 162 and 163 are so configured as to have the higher value of the saturation magnetic flux density. Accordingly, in comparison with Experiment Example 5, the perpendicular-component magnetic field of the recording magnetic field, and the component gradient of the perpendicular magnetic field in the down track direction may be prevented from being reduced while the ATE effective magnetic field is controlled to be almost in the same level. Especially Experiment Examples 2 and 3 show the better improvement of the perpendicular-component magnetic field and the component gradient of the perpendicular magnetic field in the down track direction than in Experiment Example 4.

While the invention has been described with the embodiment, the invention is not restrictive to the foregoing description about the embodiment, and numerous other modifications and variations may be devised. For example, the perpendicular magnetic write head of the invention is applied to a combined head, but this is surely not restrictive, and may be applied to a head specifically for recording use with no reproduction head section.

In the embodiment described above, the leading shield 8B and the pair of side shields 16 are each divided into three area portions so as to vary by degrees the saturation magnetic flux density Bs. The invention is surely not restrictive thereto, and alternatively, such shields may be each divided into two area portions, or four or more area portions, for example. Still alternatively, such shields may be each divided into an infinite number of portions, i.e., the saturation magnetic flux density Bs may be varied in value in a successive manner. If these are the cases, the effects and advantages achieved in the embodiment above may be at least expected.

The correlation between the reference numerals and the components in the embodiment are as below.

1 . . . substrate, 2, 9, 11 to 13, 20, 21, and 23 . . . insulation layer, 3 . . . lower lead shield, 4 . . . shield gap, 5 . . . upper lead shield, 6 . . . magnetic resistance effects (MR) element, 7 . . . separation layer, 8A and 8C . . . magnetic layer, 8B . . . leading shield, 10 and 22 . . . thin-film coil, 14 . . . main magnetic-pole layer, 14A . . . tip end portion, 14B . . . rear end portion, 15 . . . side gap (SG), 16 . . . side shield, 17 . . . trailing shield, 18 . . . trailing gap, 19 . . . auxiliary magnetic-pole layer, 24 . . . return yoke layer, 25 . . . overcoat layer, 30 . . . air bearing surface, 40 . . . recording medium, 100A . . . reproduction head section, 100B . . . write head section, 200 . . . chassis, 201 . . . magnetic disk, 202 . . . magnetic head slider, 203 . . . suspension, 204 . . . arm, 205 . . . spindle motor, 206 . . . drive section, 207 . . . fixed shaft, 208 . . . bearing, 211 . . . substrate, 212 . . . thin-film magnetic head, and 220 . . . air bearing surface.

What is claimed is:

1. A perpendicular magnetic write head, comprising:

a magnetic pole having an end surface exposed to an air bearing surface; and a pair of side shields each having an end surface exposed to the air bearing surface, and disposed on both sides of the magnetic pole in a cross track direction with side gaps in between, wherein each of the pair of side shields is configured in such a manner that a saturation magnetic flux density thereof increases as a distance from the magnetic pole in the cross track direction increases.

2. The perpendicular magnetic write head according to claim 1, wherein each of the pair of side shields is configured of a plurality of zone portions having respective saturation magnetic flux densities different from each other, the plurality of zone portions being disposed in order to be away from the magnetic pole in the cross track direction.

3. The perpendicular magnetic write head according to claim 1, wherein each of the pair of side shields is configured of first to third zone portions having respective saturation magnetic flux densities different from each other, the first to third zone portions being disposed in order to be away from the magnetic pole in the cross track direction.

4. The perpendicular magnetic write head according to claim 1, wherein each of the pair of side shields is configured of first and second zone portions having respective saturation magnetic flux densities different from each other, the first and second zone portions being disposed in order to be away from the magnetic pole in the cross track direction.

5. The perpendicular magnetic write head according to claim 2, further comprising a leading shield disposed on a leading side of both the magnetic pole and the pair of side shields with leading gaps in between, and having an end surface exposed to the air bearing surface, wherein the leading shield is configured in such a manner that a saturation magnetic flux density of a region thereof corresponding to the magnetic pole increases as a distance from the magnetic pole in a down track direction increases.

6. The perpendicular magnetic write head according to claim 5, wherein each of the pair of side shields is configured of first to third zone portions having respective saturation magnetic flux densities different from each other, the first to third zone portions being disposed in order to be away from the magnetic pole in the cross track direction, and the leading shield is configured of fourth to sixth zone portions having respective saturation magnetic flux densities different from each other, the fourth to sixth zone portions being disposed in order to be away from the magnetic pole in the down track direction.

7. The perpendicular magnetic write head according to claim 6, wherein the saturation magnetic flux densities of the fourth to sixth zone portions are equal to the saturation magnetic flux densities of the first to third zone portions, respectively.

8. A magnetic recording device having a recording medium and a perpendicular magnetic write head, the perpendicular magnetic write head comprising:

a magnetic pole having an end surface exposed to an air bearing surface; and a pair of side shields each having an end surface exposed to the air bearing surface, and disposed on both sides of the magnetic pole in a cross track direction with side gaps in between, wherein each of the pair of side shields is configured in such a manner that a saturation magnetic flux density thereof increases as a distance from the magnetic pole in the cross track direction increases.

* * * * *